United States Patent
Ramachandran et al.

(10) Patent No.: US 10,038,377 B2
(45) Date of Patent: Jul. 31, 2018

(54) PRECHARGING A CAPACITOR WITH AN OFFSET TO MITIGATE CONTROL DELAYS IN A BUCK CONVERTER

(71) Applicant: TEXAS INSTRUMENTS INCORPORATED, Dallas, TX (US)

(72) Inventors: Bhaskar Ramachandran, Irving, CA (US); Sujan Kundpur Manohar, Dallas, TX (US); Jae Won Choi, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/232,646

(22) Filed: Aug. 9, 2016

(65) Prior Publication Data

US 2018/0048233 A1    Feb. 15, 2018

(51) Int. Cl.
H02M 3/158    (2006.01)

(52) U.S. Cl.
CPC ................... *H02M 3/158* (2013.01)

(58) Field of Classification Search
CPC .... H02M 3/158–3/1588; H02M 3/156; H02M 2001/022; G05F 5/00
USPC .................................................. 323/271, 268
See application file for complete search history.

(56) References Cited

U.S. PATENT DOCUMENTS

| | | | | |
|---|---|---|---|---|
| 2005/0105307 A1* | 5/2005 | Shearon | .................... | G06F 1/26 363/49 |
| 2013/0033904 A1* | 2/2013 | Ye | ..................... | H02M 3/33576 363/17 |
| 2014/0103898 A1* | 4/2014 | Shrivastava | ........ | H02M 3/1582 323/311 |

* cited by examiner

*Primary Examiner* — Gary L Laxton
*Assistant Examiner* — Peter Novak
(74) *Attorney, Agent, or Firm* — Lawrence J. Bassuk; Charles A. Brill; Frank D. Cimino

(57) ABSTRACT

One example includes a power supply system. The system includes a power stage comprising at least one power switch that is periodically activated during an on-time of a duty-cycle based on a switching signal to generate an output voltage at an output. The system also includes a switching controller configured to generate the switching signal based on an amplitude of a capacitor voltage at a control node associated with a capacitor that defines the on-time of the duty-cycle as a function of the capacitor being periodically charged. The switching controller includes a pre-bias stage configured to apply a pre-bias charge to the capacitor via an offset voltage prior to a start of the on-time to pre-charge parasitic capacitance associated with the power supply system prior to the start of the on-time.

17 Claims, 3 Drawing Sheets

PRECHARGING A CAPACITOR WITH AN OFFSET TO MITIGATE CONTROL DELAYS IN A BUCK CONVERTER

TECHNICAL FIELD

This disclosure relates generally to electronic systems, and more specifically to a power supply system.

BACKGROUND

Power supply circuits can be implemented in a variety of computer and/or wireless devices to provide power to circuit components therein. One example of a power supply system is a constant on-time or pseudo-constant on-time power supply in which the on-time of a switching duty-cycle associated with a power switch is based on a ratio of the input voltage and the desired output voltage. As an example, the power supply system can be required to have a very small on-time, such as based on having a high step-down ratio of the input voltage with respect to the output voltage. Such a very small on-time can result in errors associated with the duty-cycle based on delays associated with circuit components associated with the switching controller and/or the power stage.

SUMMARY

One example includes a power supply system. The system includes a power stage comprising at least one power switch that is periodically activated during an on-time of a duty-cycle based on a switching signal to generate an output voltage at an output. The system also includes a switching controller configured to generate the switching signal based on an amplitude of a capacitor voltage at a control node associated with a capacitor that defines the on-time of the duty-cycle as a function of the capacitor being periodically charged. The switching controller includes a pre-bias stage configured to apply a pre-bias charge to the capacitor via an offset voltage prior to a start of the on-time to pre-charge parasitic capacitance associated with the power supply system prior to the start of the on-time.

Another example includes a method for generating an output voltage. The method includes providing a first phase signal to a switching controller of a power supply system to activate a first control switch in response to a first logic-state of the first phase signal to provide an offset voltage to a capacitor node associated with a capacitor during a first portion of an off-time associated with a duty-cycle of at least one power switch controlled via a switching signal to apply a pre-bias charge to the capacitor. The switching signal can be provided to a power stage comprising the at least one power switch that is periodically activated during an on-time of the duty-cycle based on the switching signal to generate an output voltage at an output. The method also includes providing a second phase signal to the switching controller to activate a second control switch in response to a first logic-state of the second phase signal to provide a power voltage to the capacitor node to increase an amplitude of a capacitor voltage at the capacitor node from the offset voltage to a reference voltage during the on-time associated with the duty-cycle. The method further includes providing a third phase signal to the switching controller to activate a third control switch in response to a first logic-state of the third phase signal to discharge the capacitor during a second portion of the off-time.

Another example includes a power supply system. The system includes a power stage comprising a high-side switch that is activated during the on-time of the duty-cycle based on a switching signal and a low-side switch that is activated during an off-time of the duty-cycle based on the switching signal to generate an output voltage at an output. The system also includes a switching controller. The switching controller includes a comparator configured to generate the switching signal based on an amplitude of a capacitor voltage at a control node associated with a capacitor that defines the on-time of the duty-cycle as a function of the capacitor being periodically charged via a power voltage. The switching controller further includes a pre-bias stage configured to apply a pre-bias charge to the capacitor via an offset voltage prior to a start of the on-time to pre-charge parasitic capacitance associated with the power supply system prior to the start of the on-time.

DETAILED DESCRIPTION

This disclosure relates generally to electronic systems, and more specifically to a power supply system. The power supply system can be implemented, for example, as a constant (e.g., pseudo-constant) on-time DC-DC converter configured to generate an output voltage based on an input voltage (e.g., as a buck converter). The power supply system includes a power stage that includes at least one power switch that is periodically activated during an on-time of a duty-cycle based on a switching signal to generate the output voltage at an output. As an example, the power stage can include a high-side switch and a low-side switch to provide a switching voltage at a switch node, such that the switching voltage provides a current through an inductor to provide the output voltage at the output. The power supply system also includes a switching controller that is configured to generate the switching signal, such as at a constant or pseudo-constant on-time, such as based on a ratio of the input voltage to the output voltage. The switching controller, for example, can include a comparator that generates the switching signal based on an amplitude of a capacitor voltage at a control node associated with a capacitor that defines the on-time of the duty-cycle as a function of the capacitor being periodically charged via a power voltage (e.g., the input voltage).

The switching controller can also include a pre-bias stage that is configured to pre-bias the capacitor. As an example, the pre-bias stage can include a buffer that is configured to generate an offset voltage that has an amplitude that defines the on-time by providing an initial offset amplitude of the capacitor voltage. Thus, the pre-bias stage can provide the offset voltage to the capacitor via a control switch at a time prior to the beginning of the on-time (e.g., during a portion of the off-time of the duty-cycle). Thus, the offset voltage can provide a pre-charge of the capacitor to set the capacitor voltage to approximately the amplitude of the offset voltage prior to the start of the on-time to substantially charge parasitic capacitance associated with the power supply system, and therefore provide a precise duration of the on-time while the capacitor is charged during the on-time. Accordingly, the power supply system can have a very short on-time for a high switching frequency, even while accommodating delays in the switching controller and the power stage with respect to transitions in the on-time to the off-time.

Figure 1:
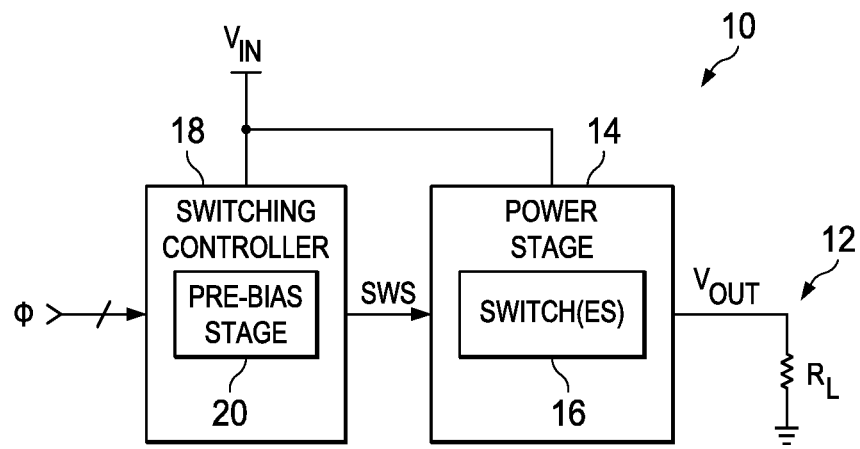
FIG. 1 illustrates an example of a power supply system.

FIG. 1 illustrates an example of a power supply system 10. The power supply system 10 can generate an output voltage $V_{OUT}$ based on an input voltage $V_{IN}$ to provide power to a load that is coupled to an output 12, demonstrated in the example of FIG. 1 as a resistor $R_L$. For example, the power supply system 10 can be configured as a buck converter. As an example, the power supply system 10 can be implemented in any of a variety of electronic circuit applications, such as in wireless communication devices, portable computing devices (e.g., laptop or tablet computers), or a variety of other electronic circuits. At least a portion of the power supply system 10 can be implemented on or as part of an integrated circuit (IC) chip.

The power supply system 10 includes a power stage 14 that is configured to generate the output voltage $V_{OUT}$ based on a switching signal SWS. In the example of FIG. 1, the power stage 14 includes at least one power switch 16 that is periodically activated during an on-time of a duty-cycle to generate the output voltage at the output 12. As described herein, the term "duty-cycle" refers to the period of activation and deactivation of the at least one power switch 16 (e.g., a high-side power switch). As an example, the switch(es) 16 of the power stage 14 can include a high-side switch and a low-side switch that are alternately activated via the switching signal SWS to provide a switching voltage at a switch node (not shown). Thus, the switching voltage can provide a current through an inductor (not shown) to provide the output voltage $V_{OUT}$ at the output 12.

The power supply system 10 also includes a switching controller 18 that is configured to generate the switching signal SWS that controls the at least one power switch 16 at the duty-cycle. As an example, the switching controller 18 can be configured to define the duty-cycle as having a constant or pseudo-constant on-time, such as based on a ratio of the input voltage $V_{IN}$ to the output voltage $V_{OUT}$. The power supply system 10 can implement the constant/pseudo-constant on-time to substantially optimize power and performance tradeoffs during various operational modes of associated electronic devices (e.g., low-power mode, sleep mode, high-performance mode, etc.). The switching controller 18, for example, can include a comparator that generates the switching signal based on an amplitude of a capacitor voltage at a control node associated with a capacitor that defines the on-time of the duty-cycle as a function of the capacitor being periodically charged via a power voltage (e.g., the input voltage $V_{IN}$) via a control switch that is activated and deactivated in response to at least one phase signal 1. For example, the comparator can compare the capacitor voltage with a reference voltage, such as based on the output voltage $V_{OUT}$, to provide the on-time as a constant or pseudo-constant on-time.

As an example, the power supply system 10 can be configured to have a high step-down ratio, which can require a very short on-time duration (e.g., between approximately 20 nanoseconds and approximately 50 nanoseconds) of the duty-cycle. Given that the reference voltage for generating the switching signal SWS can be based on a ratio of the input voltage $V_{IN}$ and the output voltage $V_{OUT}$, the on-time can be based on such a ratio. For example, for a switching frequency of approximately 1 MHz, and for an output voltage $V_{OUT}$ of approximately 1 V and input voltage $V_{IN}$ of approximately 21 V, and for a switching period $T_S$ of approximately 1 μs, the on-time can be defined as $V_{OUT}/V_{IN}*T_S$=~47 nanoseconds. However, upon a change of state (e.g., falling-edge) of switching signal SWS, additional electronics may introduce delays to the change of switching of the switch(es) 16 in the power stage 14. Thus, to compensate for such delays, the voltage across the capacitor can be provided with an additional offset voltage, such that the increasing voltage associated with the capacitor achieves the reference voltage amplitude sooner than if it would start increasing from zero volts. However, parasitic capacitance associated with the circuit components of the switching controller 18 can be unpredictable, and can delay the ramp increase of the capacitor voltage when the offset voltage and the power voltage are introduced to increase the capacitor voltage at the beginning of the on-time, thus delaying the on-time.

In the example of FIG. 1, the switching controller 18 includes a pre-bias stage 20 that can be configured to pre-bias the capacitor at a time prior to the start of the on-time. As an example, the pre-bias stage 20 can include a buffer that is configured to generate an offset voltage that has an amplitude that defines the on-time by compensating for the change-of-state delays that can be introduced by the circuitry in the switching controller 18 and/or the power stage 14 (e.g., the comparator and/or a switch driver). As an example, the pre-bias stage 20 can provide the offset voltage to the capacitor via a control switch, such as activated and deactivated in response to one of the phase signals Φ, at a time prior to the beginning of the on-time (e.g., during a portion of the off-time of the duty-cycle). Thus, the offset voltage can provide a pre-charge of the capacitor to set the capacitor voltage to approximately the amplitude of the offset voltage prior to the start of the on-time to substantially charge the parasitic capacitance associated with the power supply system 10. Accordingly, the pre-charging of the capacitor can provide a more predictable increase of the capacitor voltage, and thus a more predictable on-time duration, to allow for a very short on-time for a high switching frequency.

Figure 2:
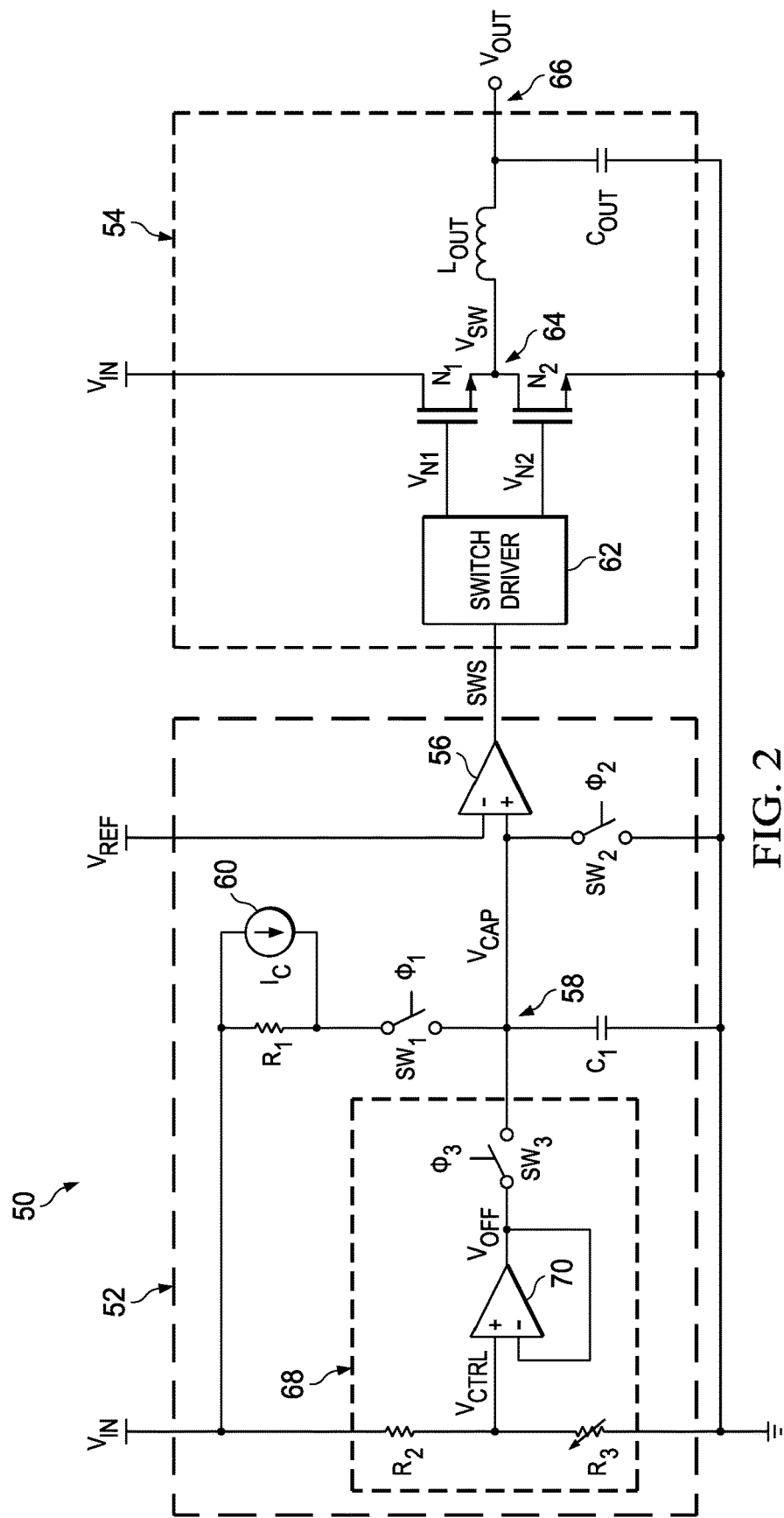
FIG. 2 illustrates an example of a timing diagram.

FIG. 2 illustrates another example of a power supply system 50. The power supply system 50 can correspond to the power supply system 10 in the example of FIG. 1, and can thus be configured as a buck converter to generate an output voltage $V_{OUT}$ in any of a variety of electronic circuit applications (e.g., a wireless communication device or portable computing device).

The power supply system 50 includes a switching controller 52 and a power stage 54. The switching controller 52 is configured to generate the switching signal SWS based on an input voltage $V_{IN}$ and a reference voltage $V_{REF}$. As an example, the reference voltage $V_{REF}$ can be based on the output voltage $V_{OUT}$, such as based on an average value of the output voltage $V_{OUT}$ plus a voltage across a DC resistance of an output inductor $L_{OUT}$ (e.g., by low-pass filtering an associated switching node). For example, as described in greater detail herein, the switching controller 58 can be configured to set a duty-cycle of a power switch as having a constant or pseudo-constant on-time, such as based on a ratio of the input voltage $V_{IN}$ to the output voltage $V_{OUT}$. The switching controller 52 includes a comparator 56 that is configured to compare a capacitor voltage $V_{CAP}$ at a node 58 that is coupled to a non-inverting input with a reference voltage $V_{REF}$ at an inverting input. The comparator 56 is thus configured to generate the switching signal SWS.

In the example of FIG. 2, the capacitor voltage $V_{CAP}$ is associated with a capacitor $C_1$ that interconnects the node 58 and a low-voltage rail (e.g., ground). The capacitor voltage $V_{CAP}$ has an amplitude that is controlled via a first control switch $SW_1$ that is activate and deactivated by a first phase signal $\Phi_1$, and via a second control switch $SW_2$ that is activate and deactivated by a second phase signal $\Phi_2$. In response to activation of the first control switch $SW_1$ via the first phase signal $\Phi_1$, the capacitor $C_1$ is charged via a current source 60 that generates a current $I_C$ and which is arranged in parallel with a resistor $R_1$ that interconnects the first control switch $SW_1$ with the input voltage V. As an example, the current $I_C$ can be approximately equal to the capacitor voltage $V_{CAP}$ divided by the resistance $R_1$. Therefore, the current $I_C$ and the current provided through the resistor $R_1$ can charge the capacitor $C_1$ to provide a ramp increase of the amplitude of the capacitor voltage $V_{CAP}$. Accordingly, while the capacitor voltage $V_{CAP}$ increases, the comparator 56 can assert the switching signal SWS during the on-time. In response to the amplitude of the capacitor voltage $V_{CAP}$ being greater than the reference voltage $V_{REF}$, the comparator 56 can de-assert the switching signal SWS. The second phase signal $\Phi_2$ can be activated to couple the capacitor node 58 to ground to set the capacitor voltage $V_{CAP}$ to approximately zero and discharge the capacitor $C_1$.

The power stage 54 includes a switch driver 62 that is configured to generate an first switch voltage $V_{N1}$ and an second switch voltage $V_{N2}$ based on the switching signal SWS. The power stage 54 includes a high-side switch, demonstrated as an N-channel field effect transistor (FET) $N_1$ that interconnects the input voltage $V_{IN}$ and a switch node 64 and which is controlled by the first switch voltage $V_{N1}$. Similarly, the power stage 54 includes a low-side switch, demonstrated as an N-channel FET $N_2$ that interconnects the switch node 64 and ground and which is controlled by the second switch voltage $V_{N2}$. Thus, the high-side switch $N_1$ is activated approximately during the on-time of the switching signal SWS to provide the input voltage $V_{IN}$ to set a switching voltage $V_{SW}$ at the switch node 64 approximately equal to the input voltage $V_{IN}$, and the low-side switch $N_2$ is activated approximately during the off-time of the switching signal SWS to sink the switching voltage $V_{SW}$ to ground. The power stage 54 also includes an output inductor $L_{OUT}$ and an output capacitor $C_{OUT}$ that are configured to filter the switching voltage $V_{SW}$ to generate the output voltage $V_{OUT}$ at an output node 66.

As described earlier, the power supply system 50 can be configured to have a high step-down ratio, which can require a very short on-time duration (e.g., approximately 20-50 nanoseconds) of the duty-cycle. As also described earlier, some of the electronic components may introduce delays between the changes of state of phase signals $\Phi_1$ and $\Phi_2$, the switching signal SWS, and the changes in amplitude of the first switch voltage $V_{N1}$ and the second switch voltage $V_{N2}$. For example, the comparator 56 can introduce a delay between the changes of state of the phase signals $\Phi_1$ and $\Phi_2$ relative to the switching signal SWS, and the switch driver 62 can introduce an additional delay between the changes of state of the switching signal SWS and the changes in amplitude of the switch voltages $V_{N1}$ and $V_{N2}$. These additional delays can affect the desired on-time of the activation of the high-side switch $N_1$, and can be compensated for adjusting the on-time of the duty-cycle by introducing an offset voltage $V_{OFF}$ to the capacitor voltage $V_{CAP}$, such that the ramp increase of the capacitor voltage $V_{CAP}$ achieves the amplitude of the reference voltage $V_{REF}$ in less time to provide an on-time activation of the high-side switch $N_1$ that compensates for the delays of the comparator 56 and the switch driver 62.

The switching controller 52 includes a pre-bias stage 68 that is configured to generate the offset voltage $V_{OFF}$. In the example of FIG. 2, the pre-bias stage 68 includes a resistor $R_2$ and a resistor $R_3$ that are arranged as a voltage-divider configured to generate a control voltage $V_{CTRL}$ from the input voltage V. As an example, the resistors $R_2$ and $R_3$ can be fabrication matched (e.g., fabricated from the same area on a common silicon wafer), such that the control voltage $V_{CTRL}$ can remain substantially stable with respect to temperature and process variations. In the example of FIG. 2, the resistor $R_3$ is demonstrated as a trimmable resistor, such that the control voltage $V_{CTRL}$ can be set to a desired amplitude, such as to correspond to a desired on-time of the switching signal SWS. For example, the resistance of the resistor $R_3$ can be trimmed to set the amplitude of the control voltage $V_{CTRL}$ based on the desired on-time of the switching signal SWS, which can be based on a known delay associated with the comparator 56 and the switch driver 62. As an example, the resistor $R_2$ can have a resistance magnitude that is approximately equal to the resistance $R_1$ minus the resistance $R_3$.

The control voltage $V_{CTRL}$ can be provided to an inverting input of an operational amplifier (OP-AMP) 70 that is arranged as a buffer based on having an output that is coupled to the inverting input. Thus, the OP-AMP 70 is configured to generate the offset voltage $V_{OFF}$. The pre-bias stage 68 further includes a third control switch $SW_3$ that is activated and deactivated via a third phase signal $\Phi_3$. The third control switch $SW_3$ interconnects the output of the OP-AMP 70 with the capacitor node 58, such that when the third control switch $SW_3$ is activated (i.e., closed), the offset voltage $V_{OFF}$ is provided to the capacitor node 58. For example, the phase signals $\Phi_1$, $\Phi_2$, and $\Phi_3$ can be activated in a mutually exclusive sequence to control the amplitude of the capacitor voltage $V_{CAP}$. Thus, at a time prior to the start of the on-time of the duty-cycle, and thus while the control switches $SW_1$ and $SW_2$ are deactivated, the third control switch $SW_3$ can be activated to provide the offset voltage $V_{OFF}$ to the capacitor node 58 to pre-charge the capacitor $C_1$ via the offset voltage $V_{OFF}$, and thus set the capacitor voltage $V_{CAP}$ approximately equal to the offset voltage $V_{OFF}$. As an example, the offset voltage $V_{OFF}$ can have an amplitude that can be expressed as:

$$V_{OFF} = K * V_{EN} = (R_3/(R_3+R_2)) * V_{IN} \qquad \text{Equation 1}$$

Where: K is set to a delay time associated with the comparator 56 plus a delay time associated with the switch driver 62, divided by the switching period.

Thus, the offset voltage $V_{OFF}$ can likewise charge the parasitic capacitance of the electronic components of the switching controller 52 (e.g., the comparator 56). As a result, in response to activation of the first control switch $SW_1$, the capacitor voltage $V_{CAP}$ can begin to increase from a first amplitude approximately equal to the offset voltage $V_{OFF}$ to a second amplitude approximately equal to the reference voltage $V_{REF}$ without any delay resulting from parasitic capacitance associated with the circuit components of the switching controller 52. Accordingly, the on-time of the activation of the high-side switch $N_1$ can be very precisely controlled. Additionally, as an example, at the system level, the respective delays of the comparator 56 and the switch 62 can be predetermined for recommended external power FETs (e.g., corresponding to the high-side switch $N_1$ and/or the low-side switch $N_2$), as such delays can be characterized well during design of the IC in which the power supply system 50 is fabricated. Additionally, the resistor $R_3$ can be appropriately trimmed to provide suitable resistance to program the offset voltage $V_{OFF}$ for the on-time compensation described herein. Therefore, the operation of the pre-bias stage 68 can be scalable across different designs of the power supply system 50 that implement respective different designs for one or more of the comparator 56, the switch driver 62, and the high-side switch $N_1$ (e.g., provided externally with respect to the IC).

It is to be understood that the power supply system 50 is not intended to be limited to the example of FIG. 2. As an example, the power supply system 50 is demonstrated simplistically for brevity, such that the power supply system 50 that includes the switching controller 52, and thus the pre-bias stage 68, can include additional circuit components. For example, the power supply system 50 can also include a boot-strap capacitor, a feedback system associated with the output voltage $V_{OUT}$ (e.g., including a voltage-divider), a digital interface for controlling the switching signals, etc. Accordingly, the power supply system 50 can be implemented in a variety of ways. Furthermore, the operation of the pre-bias stage 68 can be implemented in a variety of other types of power supply systems, such as, for example, integrated FET DC-DC converters.

Figure 3:
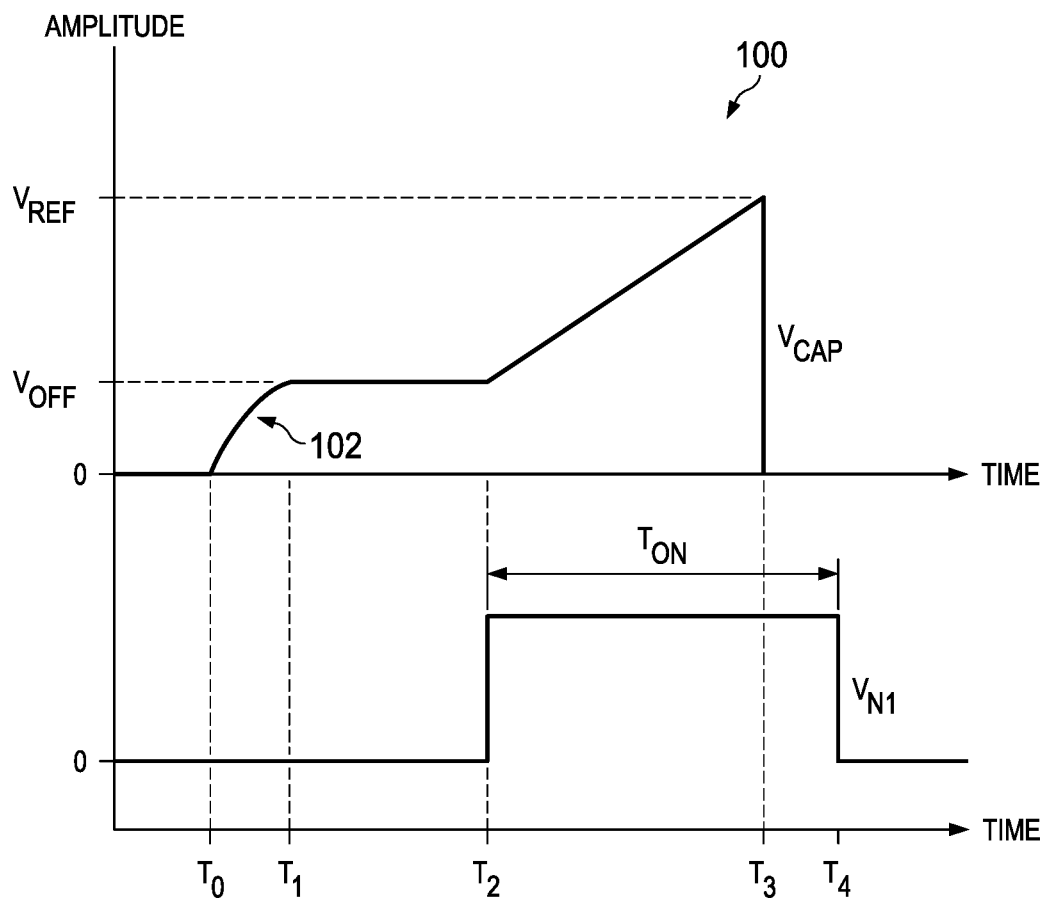
FIG. 3 illustrates another example of a power supply system.

FIG. 3 illustrates an example of a timing diagram 100. The timing diagram 100 can correspond to the operation of the power supply system 50 in the example of FIG. 2. Particularly, the timing diagram 100 demonstrates the capacitor voltage $V_{CAP}$ and the first switch voltage $V_{N1}$ plotted as a function of time. Therefore, reference is to be made to the example of FIG. 2 in the following description of the example of FIG. 3.

The timing diagram 100 begins during an off-time of the duty-cycle, with the capacitor voltage $V_{CAP}$ and the first switch voltage $V_{N1}$ having respective amplitudes of approximately zero. At a time $T_0$, the control switch $SW_2$ can be deactivated via the second phase signal $\Phi_2$ and the control switch $SW_3$ can be activated via the third phase signal $\Phi_3$ to provide the offset voltage $V_{OFF}$ to the capacitor node 58. In response the capacitor $C_1$ can be pre-charged to set the capacitor voltage $V_{CAP}$ to approximately the amplitude of the offset voltage $V_{OFF}$. In the example of FIG. 3, the amplitude of the capacitor voltage $V_{CAP}$ is demonstrated as increasing gradually, as demonstrated at 102, based on the parasitic capacitance of the circuit components of the switching controller 52. Therefore, the offset voltage $V_{OFF}$, when provided to the capacitor $C_1$ at the capacitor node 58, pre-charges the capacitor $C_1$ as well as the parasitic capacitance associated with the electronic circuit components of the power supply system 50. At a time $T_1$, the parasitic capacitance of the electronic circuit components of the power supply system 50 is substantially fully charged, such that the capacitance voltage $V_{CAP}$ has an amplitude that is set to approximately the amplitude of the offset voltage $V_{OFF}$.

At a time $T_2$, the control switch $SW_3$ can be deactivated via the third phase signal $\Phi_3$ and the control switch $SW_1$ can be activated via the first phase signal $\Phi_1$ to provide the power voltage (e.g., the current $I_C$ and the current through the resistor $R_1$ from the input voltage $V_{IN}$) to the capacitor node 58. Therefore, the capacitor voltage $V_{CAP}$ begins to increase from the amplitude of the offset voltage $V_{OFF}$ in a linear manner. In response to the increase of the capacitor voltage $V_{CAP}$, the switching signal SWS (not shown in the example of FIG. 3) is asserted logic-high to deactivate the second switch voltage $V_{N2}$ and to activate the first switch voltage $V_{N1}$. In the example of FIG. 3, the activation of the first switch voltage $V_{N1}$ is substantially concurrent with the time $T_2$. Therefore, the timing diagram 100 demonstrates the beginning of the on-time $T_{ON}$ associated with the increase of the capacitor voltage $V_{CAP}$ begins, and thus the activation of the high-side switch $N_1$ to provide the input voltage $V_{IN}$ to the switch node 64.

The capacitor voltage $V_{CAP}$ increases until the capacitor voltage $V_{CAP}$ is just greater than the reference voltage $V_{REF}$ at a time $T_3$. At the time $T_3$, the comparator 56 can de-assert the switching signal SWS. Substantially concurrently at the time $T_3$, the control switch $SW_1$ can be deactivated via the first phase signal $\Phi_1$ and the control switch $SW_2$ can be activated via the second phase signal $\Phi_2$ to short the capacitor node 58 to ground to set the capacitor voltage $V_{CAP}$ to approximately zero amplitude and to discharge the capacitor $C_1$. In response to de-assertion of the switching signal SWS, the switch driver 62 can deactivate the first switch voltage $V_{N1}$ and can activate the second switch voltage $V_{N2}$. It is to be understood that the switch driver 62 can be configured to introduce an intentional delay between the changes of the first switch voltage $V_{N1}$ and the second switch voltage $V_{N2}$ to substantially mitigate a shoot-through of the input voltage $V_{IN}$ to ground. However, based on delays associated with both the comparator 56 and the switch driver 62, the first switch voltage $V_{N1}$ does not change to a zero amplitude until a subsequent time $T_4$. Therefore, the on-time $T_{ON}$ concludes at the time $T_4$. Accordingly, the on-time $T_{ON}$ is based on the amplitude of the offset voltage $V_{OFF}$, the slope of the increase of the capacitor voltage $V_{CAP}$, the amplitude of the reference voltage $V_{REF}$, and the delays associated with both the comparator 56 and the switch driver 62. However, based on the pre-charging of the capacitor $C_1$, the capacitor voltage $V_{CAP}$ can increase predictably and substantially immediately from the amplitude of the offset voltage $V_{OFF}$, thus providing a more precise on-time of the duty-cycle of the power switch $N_1$.

Figure 4:
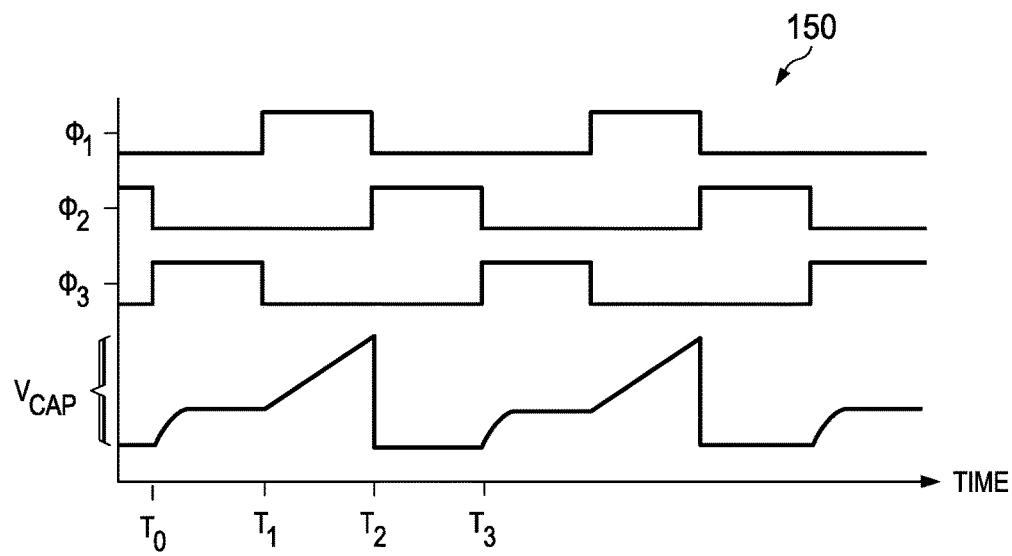
FIG. 4 illustrates another example of a timing diagram.

As described previously, the phase signals $\Phi_1$, $\Phi_2$, and $\Phi_3$ can be activated in a mutually exclusive sequence to control the amplitude of the capacitor voltage $V_{CAP}$. FIG. 4 illustrates another example of a timing diagram 150. The timing diagram 150 can correspond to the operation of the power supply system 50 in the example of FIG. 2. Particularly, timing diagram 150 demonstrates the first phase signal $\Phi_1$, the second phase signal $\Phi_2$, the third phase signal $\Phi_3$, and the capacitor voltage $V_{CAP}$ plotted as a function of time. Therefore, reference is to be made to the example of FIG. 2 in the following description of the example of FIG. 4.

At a time prior to a time $T_0$, the power switch $N_1$ can be in a first portion of an off-time of the duty-cycle. At the time $T_0$, the second phase signal $\Phi_2$ is de-asserted and the third phase signal $\Phi_3$ is asserted. In response, the control switch $SW_2$ is deactivated via the second phase signal $\Phi_2$ and the control switch $SW_3$ is activated via the third phase signal $\Phi_3$ to provide the offset voltage $V_{OFF}$ to the capacitor node 58. In response the capacitor $C_1$ can be pre-charged to set the capacitor voltage $V_{CAP}$ to approximately the amplitude of the offset voltage $V_{OFF}$ during a second portion of the off-time of the power switch $N_1$. In the example of FIG. 4, the amplitude of the capacitor voltage $V_{CAP}$ is demonstrated as increasing gradually based on the parasitic capacitance of the circuit components of the switching controller 52. Therefore, the offset voltage $V_{OFF}$, when provided to the capacitor $C_1$ at the capacitor node 58, pre-charges the capacitor $C_1$ as well as the parasitic capacitance associated with the electronic circuit components of the power supply system 50 to set the amplitude of the capacitor voltage $V_{CAP}$ equal to approximately the amplitude of the offset voltage $V_{OFF}$.

At a time $T_1$, the third phase signal $\Phi_3$ is de-asserted and the first phase signal $\Phi_1$ is asserted. In response, the control switch $SW_3$ is deactivated via the third phase signal $\Phi_3$ and the control switch $SW_1$ is activated via the first phase signal $\Phi_1$ to provide the power voltage (e.g., the current $I_C$ and the current through the resistor $R_1$ from the input voltage $V_{IN}$) to the capacitor node 58. Therefore, the capacitor voltage $V_{CAP}$ begins to increase from the amplitude of the offset voltage $V_{OFF}$ in a linear manner. Based on the pre-charge of the capacitor $C_1$, the capacitor voltage $V_{CAP}$ begins to increase immediately, without any delays associated with the parasitic capacitance of the electronic circuit components of the power supply system 50. The increase of the capacitor voltage $V_{CAP}$ can thus begin the on-time of the activation of the power switch $N_1$ in the power stage 62.

At a time $T_2$, the first phase signal $\Phi_1$ is de-asserted and the second phase signal $\Phi_2$ is asserted. In response, the control switch $SW_1$ is deactivated via the first phase signal $\Phi_1$ and the control switch $SW_2$ is activated via the second phase signal $\Phi_2$ to short the capacitor node 58 to ground to set the capacitor voltage $V_{CAP}$ to approximately zero amplitude and to discharge the capacitor $C_1$. Therefore, the decrease of the capacitor voltage $V_{CAP}$ to approximately zero amplitude can begin the off-time of the duty-cycle of the power switch $N_1$, after the delays associated with the comparator 56 and the switch driver 62. The sequence of activation of the control switches $SW_1$, $SW_2$, and $SW_3$ via the respective phase signals $\Phi_1$, $\Phi_2$, and $\Phi_3$ can thus repeat beginning at a time $T_3$. Therefore, the sequential activation of the control switches $SW_1$, $SW_2$, and $SW_3$ via the respective phase signals $\Phi_1$, $\Phi_2$, and $\Phi_3$ can provide a more precise control of the on-time of the duty-cycle of the power switch $N_1$ for generation of the amplitude of the output voltage $V_{OUT}$ in a more accurate manner.

Figure 5:
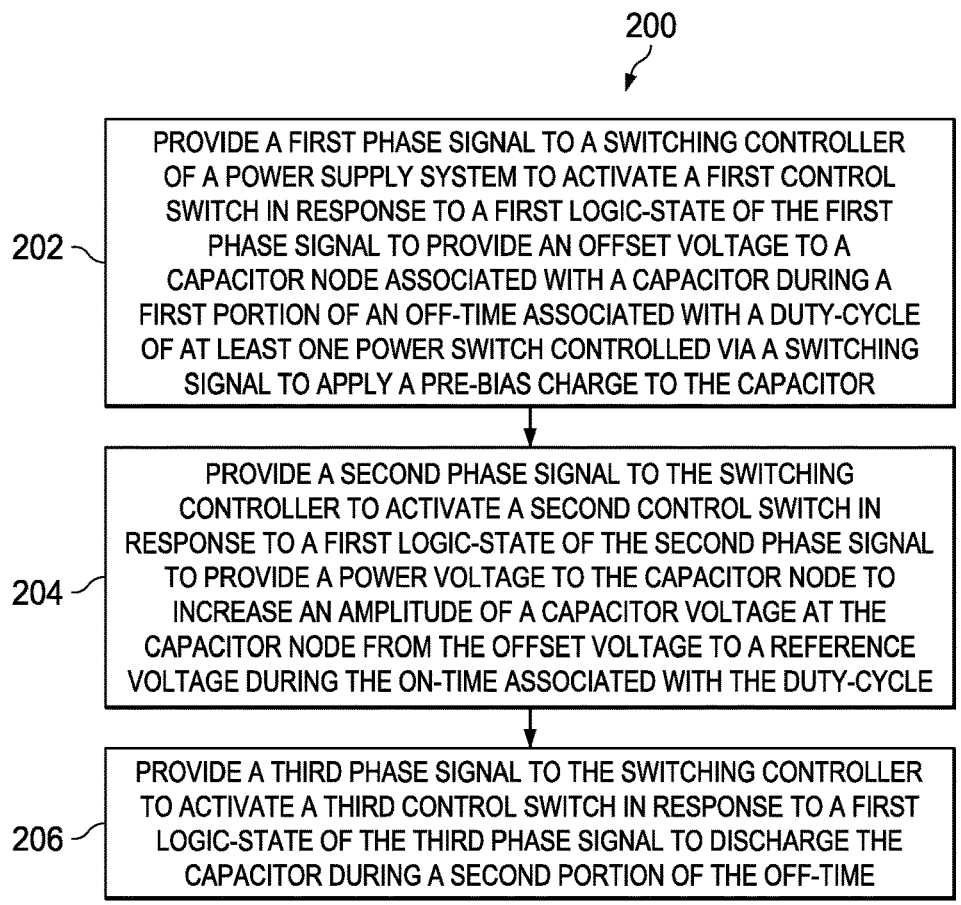
FIG. 5 illustrates an example of a method for generating an output voltage in a power supply system.

In view of the foregoing structural and functional features described above, a method in accordance with various aspects of the present disclosure will be better appreciated with reference to FIG. 5. While, for purposes of simplicity of explanation, the method of FIG. 5 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure.

FIG. 5 illustrates a method 200 for generating an output voltage (e.g., the output voltage $V_{OUT}$). At 202, a first phase signal (e.g., the third phase signal $\Phi_3$) is provided to a switching controller (e.g., the switching controller 18) of a power supply system (e.g., the power supply system 10) to activate a first control switch (e.g., the third control switch $SW_3$) in response to a first logic-state of the first phase signal to provide an offset voltage (e.g., the offset voltage $V_{OFF}$) to a capacitor node (e.g., the capacitor node 58) associated with a capacitor (e.g., the capacitor $C_1$) during a first portion of an off-time associated with a duty-cycle of at least one power switch (e.g., the power switch(es) 16) controlled via a switching signal (the switching signal SWS) to apply a pre-bias charge to the capacitor. The switching signal can be provided to a power stage (the power stage 14) comprising the at least one power switch that is periodically activated during an on-time of the duty-cycle based on the switching signal to generate the output voltage at an output (e.g., the output 12). At 204, a second phase signal (e.g., the first phase signal $\Phi_1$) is provided to the switching controller to activate a second control switch (e.g., the first control switch $SW_1$) in response to a first logic-state of the second phase signal to provide a power voltage (e.g., the voltage $V_{IN}$) to the capacitor node to increase an amplitude of a capacitor voltage at the capacitor node from the offset voltage to a reference voltage (e.g., the reference voltage $V_{REF}$) during the on-time associated with the duty-cycle. At 206, a third phase signal (e.g., the second phase signal $\Phi_2$) is provided to the switching controller to activate a third control switch (e.g., the second control switch $SW_2$) in response to a first logic-state of the third phase signal to discharge the capacitor during a second portion of the off-time.

What have been described above are examples of the disclosure. It is, of course, not possible to describe every conceivable combination of components or method for purposes of describing the disclosure, but one of ordinary skill in the art will recognize that many further combinations and permutations of the disclosure are possible. Accordingly, the disclosure is intended to embrace all such alterations, modifications, and variations that fall within the scope of this application, including the appended claims.

What is claimed is:

1. A power supply system comprising:
   a power stage including at least one power switch that is periodically activated during an on-time of a duty-cycle based on a switching signal at a power stage input to generate an output voltage at a power stage output, the duty cycle having an on-time and an off-time; and
   a switching controller including a capacitor coupled to a control node, the switching controller configured to generate the switching signal at the power stage input based on an amplitude of a capacitor voltage at the control node that defines the on-time of the duty-cycle, the switching controller including;
   a first control switch coupled to the capacitor that is activated in response to a first phase signal to provide an offset voltage to the capacitor via a voltage buffer; and
   a second control switch coupled to the capacitor that is activated in response to a second phase signal to provide a power voltage to the capacitor node to charge the capacitor during the on-time; and
   a third control switch coupled to the capacitor that is activated in response to a third phase signal to discharge the capacitor during a first portion of the off-time, wherein the third control switch is deactivated and the first control switch is activated during a remaining portion of the off-time.

2. The system of claim 1, in which the first phase signal is de-asserted approximately concurrently with assertion of the second phase signal in a sequence corresponding to a transition from the off-time to the on-time of the duty-cycle.

3. The system of claim 1, in which the switching controller has a pre-bias stage that includes:
   a voltage-divider configured to generate a control voltage based on an input voltage;
   a buffer configured to generate the offset voltage based on the control voltage; and
   the first control switch interconnecting an output of the buffer and the capacitor and that is activated prior to the start of the on-time to provide the offset voltage to the capacitor.

4. The system of claim 3, in which the voltage-divider includes a fixed resistor and a trimmable resistor, the trimmable resistor having a resistance value that is set to define an amplitude of the offset voltage.

5. The system of claim 4, in which the offset voltage is defined as:

$$VOFF=K*VIN=(R3/(R3+R2))*VIN;$$

Wherein: VOFF is the offset voltage;
VIN is the input voltage;
R2 is a resistance of the fixed resistor;
R3 is a resistance of the trimmable resistor; and
K is set to a predetermined delay time associated with at least one of the power stage and the switching controller divided by a switching period.

6. The system of claim 3, in which the voltage-divider includes a pair of fabrication-matched resistors to generate the control voltage as constant with respect to temperature variations.

7. The system of claim 1, in which the offset voltage is set to an amplitude that defines the on-time of the duty-cycle corresponding to a pseudo-constant duty-cycle.

8. The system of claim 1, in which the at least one power switch includes a high-side switch that is activated during the on-time of the duty-cycle and the power stage includes a low-side switch that is activated during the off-time of the duty-cycle.

9. An integrated circuit (IC) chip comprising at least the power stage of the supply system of claim 1, the power stage including at least one integrated field-effect transistor (FET).

10. A power supply system comprising:
a power stage including a high-side switch that is activated during an on-time of a duty-cycle based on a switching signal and a low-side switch that is activated during an off-time of the duty-cycle based on the switching signal to generate an output voltage at an output; and
a switching controller including:
a comparator and a capacitor coupled to a control node, the comparator configured to generate the switching signal based on an amplitude of a capacitor voltage at the control node that defines the on-time and the off-time of the duty-cycle as a function of the capacitor being periodically and respectively charged via a power voltage and discharged to ground; and
a pre-bias stage configured to apply an offset voltage to the capacitor prior to a start of the on-time, the pre-bias stage including:
a voltage-divider configured to generate a control voltage based on an input voltage;
a buffer configured to generate the offset voltage based on the control voltage; and
a control switch interconnecting an output of the buffer and the capacitor and which is activated prior to the start of the on-time to provide the offset voltage to the capacitor.

11. The system of claim 10, in which the pre-bias stage includes a voltage-divider that includes a fixed resistor and a trimmable resistor, the trimmable resistor having a resistance value that is set to define an amplitude of the offset voltage.

12. The system of claim 11, in which the voltage-divider includes a pair of fabrication-matched resistors to generate the control voltage as constant with respect to temperature variations.

13. A method for generating an output voltage, the method comprising:
activating a high-side switch during an on-time of a switching signal to provide a switching voltage to a switch node;
activating a low-side switch during an off-time of the switching signal to sink the switching voltage to ground;
providing a first phase signal to a first control switch to provide a power voltage to a capacitor to increase the capacitor voltage from an offset voltage to a reference voltage during the on-time, and producing the on-time of the switching signal in response to the increase in the capacitor voltage;
providing a second phase signal to a second control switch to discharge the reference voltage on the capacitor during a first portion of the off-time, and producing the off-time of the switching signal in response to the discharge of voltage on the capacitor;
providing a third phase signal to a third control switch to provide the offset voltage to the capacitor during a second portion of the off-time of the switching signal; and
producing the output voltage from the switching voltage through an inductor and from a capacitor.

14. The method of claim 13 in which the first portion of the off-time occurs before the second portion of the off-time.

15. The method of claim 13 in which providing a first phase signal to a first control switch includes providing the power voltage from a current source.

16. The method of claim 13 in which producing the on-time and the off-time of the switching signal includes comparing the capacitor voltage to a reference voltage.

17. The method of claim 13 in which providing a third phase signal to a third control switch includes providing the offset voltage from a voltage-divider and a buffer.

* * * * *